US012730192B2

(12) United States Patent
Fröhlich et al.

(10) Patent No.: US 12,730,192 B2
(45) Date of Patent: Sep. 8, 2026

(54) LASER SCANNER

(71) Applicant: ZOLLER & FRÖHLICH GMBH, Wangen im Allgäu (DE)

(72) Inventors: Christoph Fröhlich, Wangen (DE); Markus Mettenleiter, Isny (DE)

(73) Assignee: ZOLLER & FRÖHLICH GMBH (DE)

( * ) Notice: Subject to any disclaimer, the term of this patent is extended or adjusted under 35 U.S.C. 154(b) by 750 days.

(21) Appl. No.: 18/031,719

(22) PCT Filed: Oct. 15, 2021

(86) PCT No.: PCT/EP2021/078702
§ 371 (c)(1),
(2) Date: Apr. 13, 2023

(87) PCT Pub. No.: WO2022/079293
PCT Pub. Date: Apr. 21, 2022

(65) Prior Publication Data

US 2023/0417875 A1 Dec. 28, 2023

(30) Foreign Application Priority Data

Oct. 16, 2020 (DE) ......................... 102020127350.9
Jun. 28, 2021 (DE) ......................... 102021116581.4

(51) Int. Cl.
*G01C 3/08* (2006.01)
*G01S 7/481* (2006.01)
(Continued)

(52) U.S. Cl.
CPC .......... *G01S 7/4813* (2013.01); *G01S 7/4817* (2013.01); *G01S 7/497* (2013.01); *G01S 17/42* (2013.01)

(58) Field of Classification Search
CPC ...... G01S 7/4813; G01S 7/4817; G01S 7/497; G01S 17/42
See application file for complete search history.

(56) References Cited

U.S. PATENT DOCUMENTS 3,437,411 A 4/1969 Rudomanski et al.
10,983,214 B2 4/2021 Fröhlich et al.
(Continued)

FOREIGN PATENT DOCUMENTS

DE 1472198 A1 1/1969
DE 10150436 B4 5/2008
(Continued)

OTHER PUBLICATIONS

First European Office Action issued in correlated European Patent Application 21793932.1 on Sep. 15, 2023.
(Continued)

*Primary Examiner* — Mark Hellner
(74) *Attorney, Agent, or Firm* — Michael J. McCandlish; Mindful IP PLLC

(57) ABSTRACT

A 2D laser scanner measures 360° profiles. The scanner has a housing on which a rotor head is retained and in which a reference module is protected against environmental influences. A housing bottom part has a hollow spindle which supports the rotating rotor head with a deflection unit. The beam path is formed in the interior of the spindle. A laser head is arranged oriented to the axis of rotation, via which the measurement beam is coupled into the laser head in the direction of the deflection unit. A receiver/detector module detects the measurement beam reflected from the measurement object. A PC/motor board, a measurement system and a connector board are received in the housing bottom part. The reference module is configured with a reference plate between the laser head and the deflection unit.

16 Claims, 3 Drawing Sheets

(51) Int. Cl.
*G01S 7/497* (2006.01)
*G01S 17/42* (2006.01)

(56) References Cited

U.S. PATENT DOCUMENTS

2016/0047914 A1 2/2016 Zweigle et al.
2020/0150243 A1* 5/2020 Di Chele .............. G01S 7/4817
2020/0166643 A1 5/2020 Stutz et al.
2020/0209522 A1* 7/2020 Yamakawa ........ B23K 26/0643

FOREIGN PATENT DOCUMENTS

DE 102016119155 A1 3/2018
DE 102017107667 A1 10/2018
DE 102019111852 * 6/2020 ........... G01S 7/4817
EP 3657203 A1 5/2020

OTHER PUBLICATIONS

Written Opinion mailed Dec 20, 2021 re PCT/EP2021/078702 (14 pages) original with English translation.
German Search Report dated Sep. 29, 2021 re DE10 2021 116 581.4 (13 pages).
International Search Report mailed Dec. 20, 2021 re PCT/EP2021/078702 (6 pages) original with English translation.

* cited by examiner 1
6
22
16
2
20
4
12
14
9
10
18
8
24

1
22
6
2
H
8
D
9
16
10
18
26
14
12
4

32
38
12
40
26
9
44
36
30
4
42
8
28
34

LASER SCANNER

CROSS REFERENCE TO RELATED APPLICATIONS

The present patent application is a national stage of, and claims priority to, PCT Application No. PCT/EP2021/078702, filed Oct. 15, 2021, which application claims the priority of the German patent application 10 2020 127 350.9 filed Oct. 16, 2020, and German patent application 10 2021 116 581.4 filed Jun. 28, 2021, the disclosures of which are incorporated by reference in the present patent application in their entireties.

TECHNICAL FIELD

The disclosure relates to a laser scanner according to the preamble of the independent claim.

BACKGROUND

From the state of the art, scanners for 3D and 2D measurement of objects are known. 3D measurement is, for instance, performed by means of a scanner as it is described in the applicant's patent DE 101 50 436 B4. A further improved 3D laser scanner is disclosed in DE 10 2016 119 155 A1 which also originates from the applicant. In the case of such a scanner the laser measurement beam, output by an optical transmitter, is deflected by a deflection unit such that an extensive, three-dimensional spatial environment measurement is enabled. The digitized measurement data are stored on a computer system and are available there for further processing and visualizing of the object measured.

3D measurement is performed by guiding the modelled laser light across the environment to be measured, wherein, for different spatial directions, both the distance and the reflectivity values may be measured punctually. Distance and reflectivity images will then result from the arrangement of all the spatial directions measured. The distance images represent the geometry of the environment, and the reflectivity images represent the visual representations thereof, in analogy to the grey-scale values of a video camera. Both images correspond pixel by pixel and are, due to the individual, active illumination with laser light, largely independent of environmental influences.

For 2D measurement, for instance, scanners are used as they are offered by the applicant as "Profiler" ® 9012. With such a scanner, 360° profile measurement is performed by the rotation of a deflection mirror of the deflection unit, wherein the number of revolutions of the deflection mirror determines the number of profiles to be measured per second, wherein each of these 360° profiles consists of individual measuring points corresponding to the scanning rate of the scanner.

For an extensive detection, for instance, when measuring contact wires, buildings close to tracks, tunnel tubes, or during mobile mapping, the carrier vehicle moves, for instance, at different speeds, depending on the desired distance of the lateral distance of two successive profiles, in the range of few m/s (inner zones of factories, etc.) up to 100 km/h (roads, etc.) or even above (highway, etc.).

The afore-mentioned "Profiler" has a stepped housing in which the components of the scanner, for instance, a laser head, a detector/receiver, a control and evaluation unit, are received. The deflection unit and the associated drive are arranged substantially in the area of a step outside of the housing, wherein the deflection unit projects from the housing to such an extent that the 360° measurement mentioned is enabled. The scanner with its comparatively high housing is installed on the carrier vehicle and is thus subjected to the airflow and other environmental influences.

In the afore-described 3D and 2D laser scanners a reference module is each provided which serves as a reference for the distance meter both for measuring the intensity and the distance. Both measuring values tend to drift as a function of temperature and are also subjected to changes by aging effects of the laser head and the electronics. These deviations are compensated for by measurement to the reference (with known distance and intensity).

In the initially mentioned 3D laser scanners pursuant to DE 101 50 634 B4 and DE 10 2016 119 155 A1 these reference modules are arranged at the housing of the scanner such that the reference faces are also detected with each profile (passage of the laser beam deflection in elevation). This can, however, not be implemented with a 2D scanner such as the "Profiler" since, as explained above, it must have a 360° field of vision.

Accordingly, a movable reference plate has been fastened to the housing of the "Profiler" so far, which is moved into the beam path (below a rotating rotor head of the deflection unit) briefly in particular intervals and otherwise remains retracted during the predominant duration of measurement. Such reference module with an extendible reference plate, however, has substantial disadvantages especially in MMS applications (Mobile Mapping System) since the extended reference plate is then subjected to the environmental influences, so that the reference module is polluted in the course of time and especially the measurement of intensity is falsified. Since the reference module during driving also becomes wet by rain, splash water or the like, rust or sandy dirt layers, which may block the mechanism of the reference module may result in combination with the mechanical pollution. Additionally, a retracted, moist and polluted reference plate may, especially in winter, lead to the formation of ice in the gap region, which may also result in blocking of the mechanism. These disadvantages are still increased by the comparatively large construction height of the housing.

DE 10 2017 107 667 A1 discloses a laser scanner in which the rotating deflection unit, a laser head, and a detector module are jointly arranged in a housing, wherein the measurement beam deflected by the rotating deflection unit exits through a rotating disk retained at the housing. In this housing, a reference module is further arranged on which the measurement beam impacts during each revolution of the deflection unit, so that the signal quality is aggravated by the permanent interaction with the reference module. A further disadvantage consists in that optimum signal quality is not guaranteed by the integration of the deflection unit in the housing, on the one hand, and the housing is of relatively awkward construction and is difficult to be kept clean, on the other hand.

Document EP 3 657 203 A1 illustrates a non-generic distance meter in which the distance measurement is performed by means of a laser beam exiting through an objective arranged at a housing in which the laser head, the detector module, and also a control unit are arranged. For referencing, a reference module may be swiveled into the beam path. With such a concept, a 2D or 3D measurement of objects is not possible since no rotating deflection unit is provided. Furthermore, the swiveling of a reference module into the beam path is problematic since the swiveling movement cannot be performed with the precision required and correspondingly changes in the reference position may take place.

SUMMARY

As compared to this, it is an object of the disclosure to provide a laser scanner with less susceptibility to pollution and accordingly improved measuring accuracy. This object is solved by a laser scanner with the features of the independent claim.

Advantageous further developments of the disclosure are the subject matter of the subclaims.

The laser scanner in accordance with the disclosure comprises a laser head for outputting a measurement beam, a rotating deflection unit for deflecting the measurement beam in the direction of a measurement object, which deflection unit is driven by means of a drive, a detector for detecting the receiver/measurement beam reflected by the measurement object, and a control and evaluation unit for signal processing. The deflection unit is received in a rotor head with a rotor housing which is mounted rotatably at a housing. The laser scanner is further provided with a reference module for compensating for environmental influences influencing the measurement signal, such as for instance a temperature drift or aging effects. In accordance with the disclosure the drive, the laser head, the detector, the control and evaluation unit, and the reference module are received in the housing, so that practically merely the rotor head with the deflection unit projects from the housing to the outside. The reference module is received within the housing also during the reference measurement, so that all components mentioned are protected reliably from external influences. Another advantage consists in that the reference module is arranged in that part of the measurement beam path which is not deflected by the deflection unit, so that no measuring errors resulting from the rotation speed of the deflection unit may occur.

The compact design has the further advantage that the air resistance of the laser scanner is minimal even at high driving speeds, so that it is subjected to minor flow forces during measurement and the measuring accuracy is thus further improved.

In a particularly preferred example, the reference module is provided with a reference plate, which is adapted to be adjusted between the laser head and the deflection unit for reference measurement in the beam path. As explained before, this reference plate is covered to the outside by the housing both during the reference measurement and also during the profile measurement.

It is particularly advantageous if the reference plate comprises two deflection surfaces, which face one another in an angled manner, by means of which the measurement beam is deflected preferably by 180° and may thus be returned in the direction of the detector.

The construction of the reference plate is particularly simple if the deflection surfaces are formed at a groove of the reference plate.

In one example, the reference plate is designed to be motor-adjustable. Basically, however, a pneumatic or hydraulic adjustment may also be chosen.

The reference measurement is particularly precise if the reference plate is guided along a linear guide.

The motor-adjustment preferably takes place by means of a linear drive.

It may, for instance, be designed with a servo motor which is connected with the reference plate by means of a steering mechanism.

In accordance with a preferred example the steering mechanism is designed with a servo lever driven by the servo motor, said servo lever being articulated to a coupling rod which is in turn hinged indirectly or directly to the reference plate, so that the travel of the reference plate is determined by the corresponding swiveling of the servo lever and the associated movement of the coupling rod.

In an example of particularly compact design the reference module is oriented within the housing such that the adjustment direction of the reference plate is oriented approximately transversely to the measurement beam. Transversely means, for instance, approximately a right angle, wherein the travel lies in the range of centimeters, for instance, between three and five centimeters.

The construction height of the laser scanner may be further reduced if the reference module, the drive, the laser head, the detector, and the control unit are arranged substantially side by side, at most with a slight vertical offset, in the housing.

The front face of the housing which is subjected to the airflow is minimal if it has a height (relative to the footprint) which is lower than the three-fold outer diameter of the rotor head. It is particularly preferred if the height of the housing corresponds approximately to twice the outer diameter of the rotor head.

Susceptibility to pollution can be further reduced if the housing is of substantially cuboid shape with substantially smooth-faced walls. Such solution has the further advantage that the air resistance is also reduced as compared to the laser scanner in accordance with the state of the art with its high built, comparatively ragged housing.

This effect can be improved even further if a cover face spaced apart from the footprint of the housing is inclined in an area spaced apart from the deflection unit.

For increasing operational reliability, sensors for detecting the reference plate position are provided in one example of the disclosure.

The concept in accordance with the disclosure is accordingly implemented such that the guiding of the reference plate is so precise that random changes in distance and intensity do not occur.

By means of the sensors, for instance, reed switches, the position of the reference plate is controlled, so that errors during reference measurement by a reference plate that has not been fully retracted or extended can be avoided.

The laser optics and also the geometry of the reference plate are adapted such that light may enter the detector/receiver even in the extreme near range within the housing.

In accordance with the disclosure it is provided for it that the relatively long travel of the reference plate, for instance, in the range of three to four centimeters, may be performed within very short time, for example, in less than a second, by a suitable design of the linear drive, wherein the individual components are optimized with respect to weight and space requirement.

In one example of the disclosure, the reference plate is manufactured of aluminum.

In the extended state the reference plate blocks the exiting laser beam, whereby it is backscattered to the optical receiver/detector at an exactly defined distance and intensity. In this process, no laser light leaves the rotor of the deflection unit, so that any randomly present environmental objects cannot falsify the reference measurement.

In the retracted state of the reference plate, the laser beam is coupled out to the environment without hindrance, and the beam path of the receiving beam reflected from the measurement object is furthermore not hindered, either.

BRIEF DESCRIPTION OF THE DRAWINGS

Preferred examples of the disclosure will be explained in detail in the following by means of schematic drawings. There show.

DESCRIPTION

Figures 1, 2, 3:
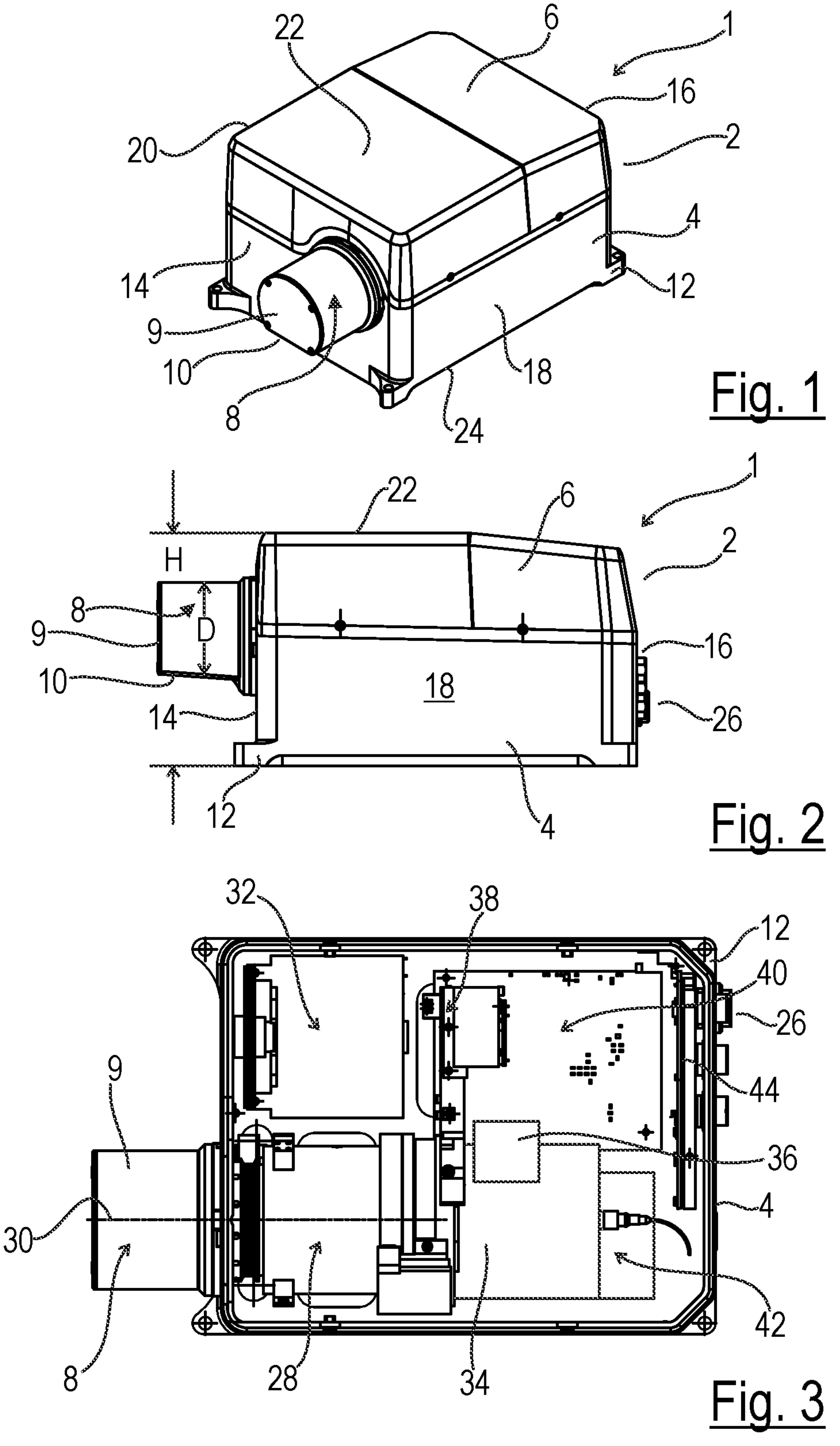
FIG. 1 a three-dimensional representation of a 2D laser scanner in accordance with the disclosure.
FIG. 2 a side view of the laser scanner according to FIG. 1.
FIG. 3 a view of the laser scanner with open housing, wherein the individual components are illustrated schematically only.

FIGS. 1 and 2 show external views of a 2D laser scanner 1 in accordance with the disclosure which enables the measurement of 360° profiles. The laser scanner 1 has a housing 2 of approximately cuboid shape with a housing bottom part 4 and a housing lid 6 which is placed upon the housing bottom part 4. A deflection unit 8 projects from the front side of the housing 2. It is received in a rotor housing of a rotor head 9 which is rotatably mounted on the housing 2, and at the flattening 10 of which—positioned at the bottom in FIG. 1—an exit window for a measurement beam is formed. The rotor head 9 with the deflection unit 8 rotates about a horizontal axis, so that a 360° profile may be scanned by the measurement beam. Support feet 12 (only one designated with a reference number) are formed at the housing bottom part 4, along which feet the laser scanner 1 is fastened on a carrier, for instance, of a carrier vehicle.

As results especially from FIG. 1, the housing 2 is, in the broadest sense, smooth-faced with rounded edges and corner regions, so that the air resistance is minimal. The housing is distinctly flatter as compared to the solutions known from the state of the art, wherein the front faces subjected to the airflow during driving of the carrier vehicle (in most cases the laser scanner 1 is oriented with the deflection unit 8 opposite to the running direction, so that the opposing front face 16 is streamed). The two front faces 14, 16 are designed with a smaller face than the side faces 18, 20 which are arranged approximately at right angles thereto and the base areas 22, 24.

FIG. 2 shows a side view of the laser scanner 1 in which the side face 18 is arranged toward the observer while the front faces 14, 16 extend perpendicularly to the drawing plane. In this illustration, connections 26 are seen which are formed at the rear front face 16 and via which the current supply and signal lines, etc. are connected.

For further minimization of the flow resistance, the front face portions formed at the housing lid 6 are slightly inclined. Also, the base area 22 is designed to incline toward the connections 26. Accordingly, the housing is optimized with respect to flow technology by the smooth-faced design and rounding of the corner regions 34 as well as the beveling of the front face regions, so that an impairment of measuring accuracy by the airflow and other environmental influences is minimized.

As explained before, the housing 2 has a very flat design. In the illustrated example, the total height H of the housing is approximately twice the diameter D of the deflection unit 8. This means that the projection of the housing in the vertical direction over the rotating deflection unit 8 is minimal.

FIG. 3 shows a top view of the housing 2 with the housing lid 6 removed, so that one looks into the interior of the housing bottom part 4. The components visible in FIG. 3 are merely implied. They are arranged more or less in a horizontal plane side by side or at most overlapping slightly in the vertical direction. FIG. 3 shows a hollow spindle 28 carrying the rotating rotor head 9 with the deflection unit 8 and mounted in the housing to rotate about the axis of rotation 30. The drive is performed by a motor 32 which is in operative connection with the spindle 28, for instance, via a toothed belt or a direct drive or the like.

The spindle 28 is designed as a hollow spindle in the interior of which the beam path is formed in sections. Oriented to the axis of rotation 30 and/or to the beam path, a laser head 34 is arranged in the housing 2, to which laser head a laser fiber is connected via which the measurement beam is coupled into the laser head 34 by means of a collimator. The measurement beam output by this transmitter/laser head 34 is output through a parabolic mirror in the direction of the deflection unit 8, wherein a deflection mirror arranged with 45° to the axis of rotation 30 is retained therein, via which the measurement beam is deflected toward the exit window which is, in the illustrated example, covered by a protection glass. The construction of such a deflection unit is described in the initially mentioned state of the art, especially in the applicant's patent DE 101 50 436 B4. The construction of the hollow mirror of the laser head 34 is, for instance, disclosed in DE 10 2006 040 812 A1 which also originates from the applicant.

Reference number 36 designates a receiver/detector module by which the measurement beam (receiver beam) deflected by the hollow mirror mentioned and reflected from the measurement object is detected.

A reference module 38 which is adapted to be moved into the beam path for reference measurement is arranged in FIG. 3 in the housing 2 transversely to the axis of rotation 30. This reference module 38 will be dealt with in detail by means of FIGS. 4 to 6.

Reference numbers 40 and 42 designate a PC board and a motor board 40 and/or the measurement system 42 for controlling the laser head 34 and the detector module 36 and for evaluating the measurement signals received. Furthermore, a connector board 44 for the connections 26 is received in the housing bottom part 4.

As explained before, these components are substantially arranged side by side in the horizontal direction, so that only little installation space in the vertical direction (vertically to the footprint) is required.

Figure 4:
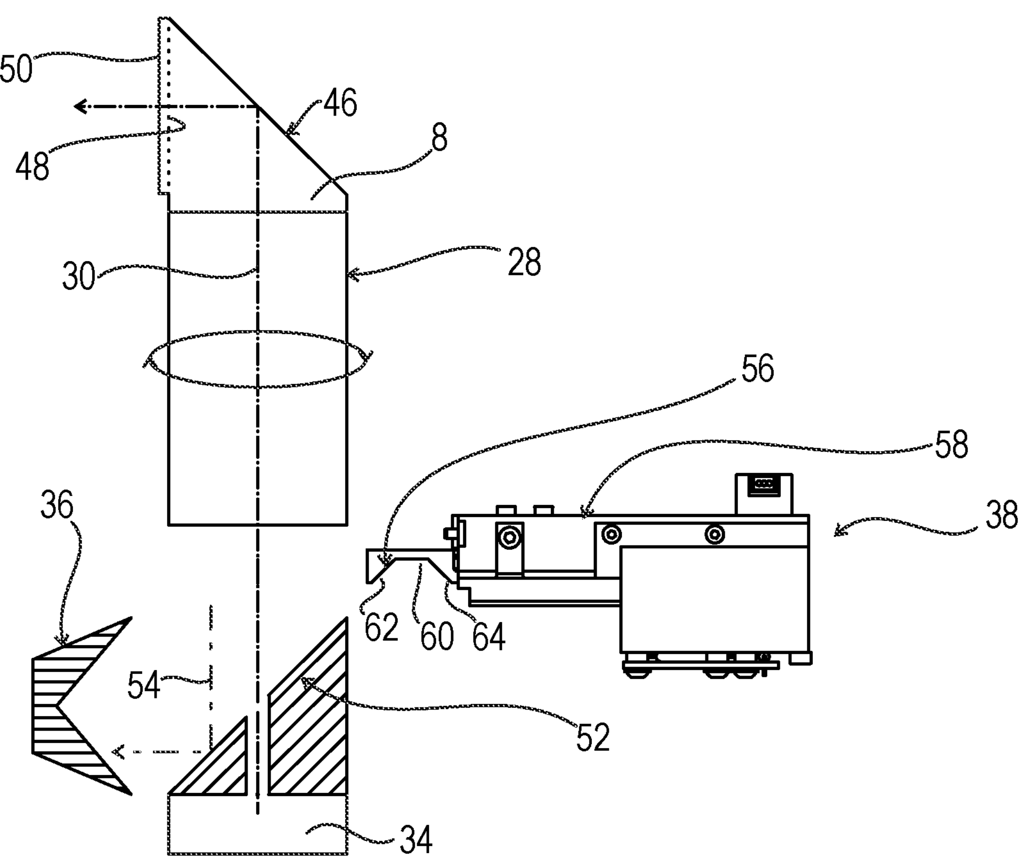
FIG. 4 a schematic diagram for illustrating the position of a reference module of the laser scanner pursuant to FIGS. 1 to 3.

In FIG. 4 the beam path of the laser scanner 1 is again illustrated by means of a strongly schematized drawing. As explained before, the rotor head 9 with the deflection unit 8 which projects from the housing 2 is driven via a spindle 46 which is designed as a hollow spindle and which is mounted to rotate about the axis of rotation 30. The measurement beam enters the spindle 46 in the direction of the axis of rotation 30 and is deflected by the deflection mirror 46 mentioned, so that it exits through the exit window 48 of the rotor head 9. As explained, this one is covered by a protection glass 50.

The measurement beam is coupled into the spindle 28 via the implied laser head 34 through a parabolic mirror (receiver mirror) 52. The measurement beam 54 reflected from the measurement object is deflected in a per se known manner at the parabolic mirror 52 toward the detector module 36. As explained in the initially mentioned state of the art, the measurement beam reflected from the measurement object enters the rotor head 9 of the deflection unit 8 through the exit window 48 and is then deflected in the direction of the parabolic mirror (receiver mirror) 52 by the deflection mirror 46.

The reference module 38, which consists basically of a reference plate 56 movable into the beam path and a drive unit 58 for adjusting the reference plate 56, is arranged transversely to the measurement beam in the region between the laser head 34 and the spindle 28.

Figure 5:
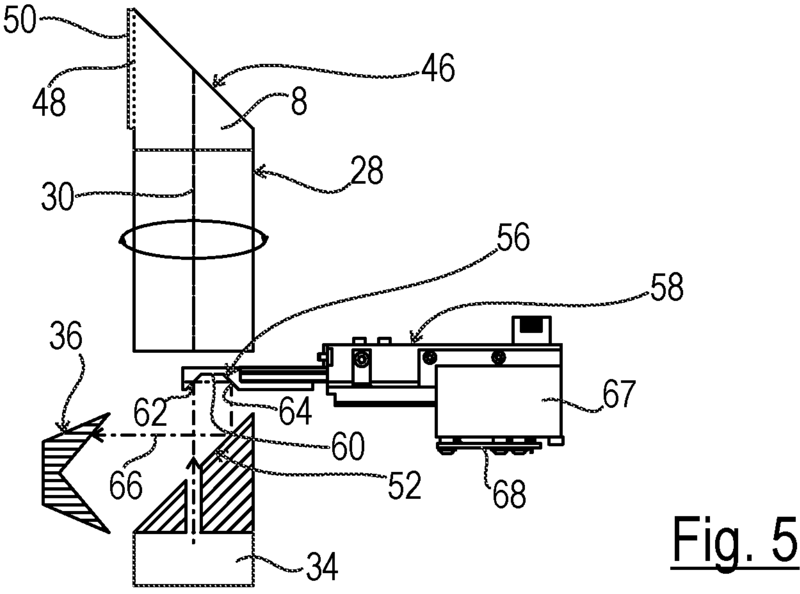
FIG. 5 a representation corresponding to FIG. 4, wherein a reference plate of the reference module is extended in the beam path.

In the illustrated example the reference plate 56 is made of aluminum and has a groove 60 at its end portion through which two inclined deflection surfaces 62, 64 are formed, along which, as illustrated in FIG. 5, the laser beam output by the laser head 34 may be deflected without laser light being permitted to enter the spindle 28. The reference plate 56, especially the groove 60, is designed such that light can enter the detector 36 even in this extreme near range.

As explained in the following, the reference plate 56 is guided very precisely along a linear guide of the drive unit 58, so that the reference plate 56 can be positioned very accurately in the beam path. For this purpose, pursuant to FIG. 5 the reference plate 56 is moved into the beam path by controlling the drive unit 58, so that the laser beam emitted by the laser head 34 is deflected in the direction of the parabolic mirror 52 by the two deflection surfaces 62, 64, which parabolic mirror 52 in turn orients the reference beam path toward the detector module 36. This reference beam path is provided with reference number 66 in FIG. 5. Accordingly, the reference plate 56, in the reference position illustrated in FIG. 5, blocks the exiting laser beam in the direction of the spindle 28, so that it is backscattered by the exact positioning of the reference plate 56 at a defined distance and intensity into the detector module 36. The design of the groove 60 with the two spaced apart deflection surfaces 62, 64 ensures that, despite the minimal distance to the detector module 36, laser light still enters same.

After the reference measurement the reference plate 56 is again moved to the basic position pursuant to FIG. 4 out of the measurement beam path which is then hindered in no way by the reference module 38.

Figure 6:
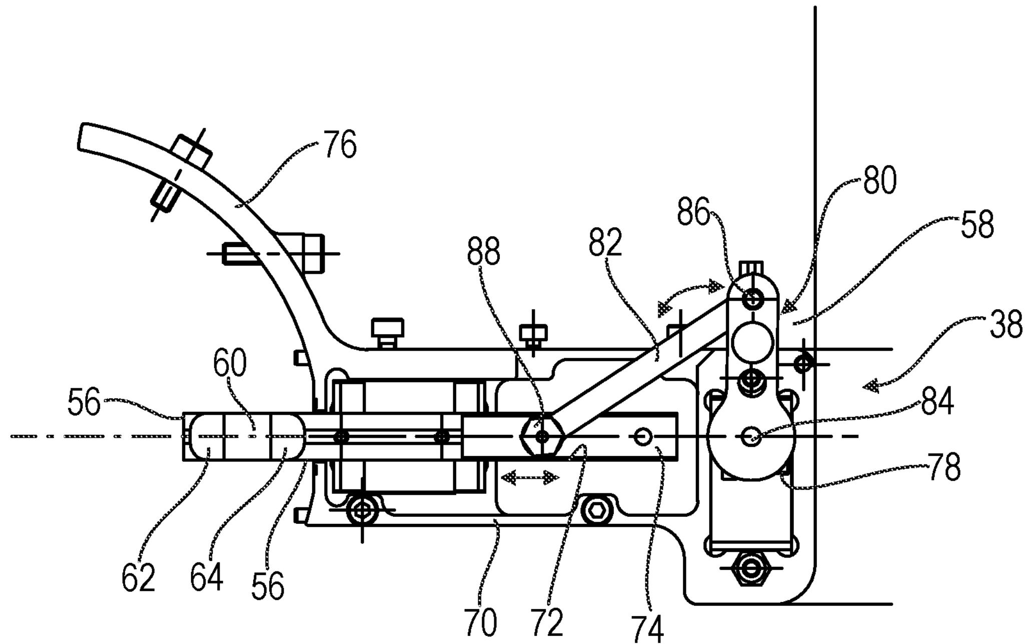
FIG. 6 a side view of the reference module pursuant to FIGS. 3, 4, 5.

By means of FIG. 6 the construction of an example of a reference module 38 is explained by way of example, wherein it is illustrated in a view twisted by 90° as compared to the illustration in FIG. 5, so that the groove 60 opens toward the observer. Furthermore, in the illustration pursuant to FIG. 6 a cover 67 by which the actual drive elements of the reference module 38 are covered and which carries a sensor board 68 has been removed.

Pursuant to the illustration in FIG. 6 the reference module 38 comprises a carrier plate 70 which is designed with a linear guide 72 along which a slider 74 carrying the reference plate 56 is guided in an extremely precise manner. In the illustrated example the carrier plate 70 is designed with a bent flange 76 by which the reference module 38 can be fastened to the laser head 34 and/or to another component.

The adjustment of the slider 74 and hence of the reference plate 56 takes place via the actual drive unit 58 which is, in the illustrated example, formed by a servo motor 78, a servo lever 80 adapted to be swiveled by it, and a coupling rod 82. The servo lever 80 is connected to a drive shaft 84 of the servo motor 78 and hinged to the coupling rod 82 via a swivel joint 86. The end portion thereof, which is remote from the servo lever 80, is in turn connected via a joint 88 with the slider 74. Accordingly, by controlling the servo motor 78 the servo lever 80 may be swiveled to the left in the illustration pursuant to FIG. 6, wherein this swivel movement is transferred via the coupling rod 82 to the slider 74, so that it is adjusted to the reference position (FIG. 5) along the linear guide 72. After the reference measurement the servo lever 80 is then swiveled back via the servo motor 78 to the position illustrated in FIG. 6, and correspondingly the slider 74 with the reference plate 56 is moved out of the beam path.

The servo motor 78 is designed such that it allows a very precise adjustment of the slider 74, wherein the end positions of the reference plate 56 are detected via suitable sensors, for instance, reed contacts, which are in operative connection with the sensor board 68. Thus, a very exact positioning of the reference plate 56, especially the groove 60 with the deflection surfaces 62, 64 is ensured within the beam path.

Instead of the linear adjustment of the reference plate 56 described, an angular adjustment may also be provided, wherein then the reference plate 56 is swiveled into the beam path.

As explained before, the reference module is covered by the housing 2 both in the basic position and in the reference position and is thus protected reliably from external influences, so that the reference measurement may take place with high precision.

Disclosed is a 2D laser scanner having a flow-optimized housing on which a rotor head is retained and in which, inter alia, a reference module is also received, such that said reference module is protected against environmental influences during the reference measurement.

LIST OF REFERENCE SYMBOLS

1 laser scanner
2 housing
4 housing bottom part
6 housing lid
8 deflection unit
9 rotor head
flattening
12 support rib
14 front face
16 front face
18 side face
20 side face
22 base area
24 base area
26 connections
28 spindle/hollow spindle
30 axis of rotation
32 motor
34 laser head
36 detector module
38 reference module
40 PC/motor board
42 measurement system
44 connector board
46 deflection mirror
48 exit window
50 protection glass
52 parabolic mirror
54 measurement beam
56 reference plate
58 drive unit
60 groove
62 deflection surface
64 deflection surface
66 reference beam path
67 cover
68 sensor board

70 support plate
72 linear guide
74 slider
76 flange
78 servo motor
80 servo lever
82 coupling rod
84 drive shaft
86 swivel joint
88 joint

What is claimed is:

1. A 2D laser scanner comprising a laser head for outputting a measurement beam, a rotating deflection unit for deflecting the measurement beam in a direction of a measurement object, which deflection unit is driven by means of a drive and is received in a rotor head which is rotatably mounted on a housing, a detector module for detecting a receiver/measurement beam reflected from the measurement object, and a control and evaluation unit for signal processing, as well as a reference module, wherein the drive, the laser head, the detector module, the control unit, and the reference module are received in the housing, wherein the reference module comprises a reference plate, which is adapted to be adjusted between the laser head and the deflection unit for reference measurement in a beam path.

2. The laser scanner according to claim 1, wherein the reference plate comprises two deflection surfaces which face one another in an angled manner, by means of which the measurement beam is deflected.

3. The laser scanner according to claim 2, wherein the measurement beam is deflected by 180°.

4. The laser scanner according to claim 1, wherein deflection surfaces are formed at a groove of the reference plate.

5. The laser scanner according to claim 1, wherein the reference plate is motor-adjustable.

6. The laser scanner according to claim 5, wherein the reference plate is guided indirectly or directly along a linear guide.

7. The laser scanner according to claim 5, wherein the motor-adjustment is performed by a linear drive.

8. The laser scanner according to claim 7, wherein the linear drive comprises a servo motor connected with the reference plate via a steering mechanism.

9. The laser scanner according to claim 8, wherein the steering mechanism comprises a servo lever driven by the servo motor, said servo lever being articulated to a coupling rod which is in turn hinged indirectly or directly to the reference plate.

10. The laser scanner according to claim 1, wherein an adjustment direction of a reference plate of the reference module is oriented transversely to the measurement beam.

11. The laser scanner according to claim 1, wherein the reference module, the drive, the laser head, the detector module, and the control unit are arranged substantially side by side in the housing.

12. The laser scanner according to claim 11, wherein the housing has a height which is smaller than a three-fold of an outer diameter of the deflection unit.

13. The laser scanner according to claim 12, wherein the height of the housing is approximately twice as much as the outer diameter of the deflection unit.

14. The laser scanner according to claim 1, wherein the housing is of approximately cuboid shape with substantially smooth-faced, rounded walls.

15. The laser scanner according to claim 1, comprising sensors, for detecting a position of a reference plate of the reference module.

16. The laser scanner according to claim 15, wherein the sensors are reed contacts.

* * * * *